(12) United States Patent
Steinborn et al.

(10) Patent No.: US 7,703,478 B2
(45) Date of Patent: Apr. 27, 2010

(54) SHIFTING UNIT

(75) Inventors: Mario Steinborn, Friedrichshafen (DE);
Rainer Petzold, Friedrichshafen (DE);
Martin Miller, Immenstaad (DE)

(73) Assignee: ZF Friedrichshafen AG,
Friedrichshafen (DE)

( * ) Notice: Subject to any disclaimer, the term of this patent is extended or adjusted under 35 U.S.C. 154(b) by 855 days.

(21) Appl. No.: 10/586,518

(22) PCT Filed: Feb. 2, 2005

(86) PCT No.: PCT/EP2005/001008

§ 371 (c)(1),
(2), (4) Date: Jul. 18, 2006

(87) PCT Pub. No.: WO2005/078318

PCT Pub. Date: Aug. 25, 2005

(65) Prior Publication Data

US 2007/0119298 A1    May 31, 2007

(30) Foreign Application Priority Data

Feb. 11, 2004    (DE) .................. 10 2004 006 683

(51) Int. Cl.
*F16K 31/06* (2006.01)
(52) U.S. Cl. .............. 137/596.17; 91/444; 60/484; 475/119
(58) Field of Classification Search ........... 137/596.17, 137/596.2, 884, 598; 91/444, 448, 454; 475/119, 475/133; 477/907; 60/484, 460
See application file for complete search history.

(56) References Cited

U.S. PATENT DOCUMENTS

| 2,363,481 | A | * | 11/1944 | Campbell ................ 137/596.2 |
| 2,377,115 | A | * | 5/1945 | Der Werff ................ 137/596.2 |
| 2,526,570 | A | * | 10/1950 | Majneri ...................... 137/598 |
| 3,654,960 | A | * | 4/1972 | Kiernan ...................... 137/884 |
| 3,851,566 | A | * | 12/1974 | Herrmann ..................... 91/444 |
| 4,170,214 | A | * | 10/1979 | Gill et al. ................... 137/884 |
| 4,281,682 | A | * | 8/1981 | Satoh .................... 137/596.17 |
| 5,235,811 | A | * | 8/1993 | Arii et al. ..................... 60/484 |
| 5,333,449 | A | * | 8/1994 | Takahashi et al. ............. 91/448 |
| 5,560,387 | A | * | 10/1996 | Devier et al. ........... 137/596.17 |
| 6,223,763 | B1 | * | 5/2001 | Meyer et al. |
| 6,301,984 | B1 | * | 10/2001 | Petzold ....................... 74/335 |
| 6,457,487 | B1 | * | 10/2002 | Stephenson et al. .... 137/596.17 |
| 6,467,264 | B1 | * | 10/2002 | Stephenson et al. |
| 6,715,400 | B2 | * | 4/2004 | Muth et al. ................. 137/884 |

(Continued)

FOREIGN PATENT DOCUMENTS

DE    197 56 638 A1  *  6/1999

(Continued)

*Primary Examiner*—John Rivell
*Assistant Examiner*—Craig Price
(74) *Attorney, Agent, or Firm*—Davis & Bujold, P.L.L.C.

(57) ABSTRACT

In a shifting unit (1) for a vehicle transmission gearbox, the switching unit comprising valves which are connected between with one another by a pressure supply line conduit (58) and by a pressure exhaust line (60) associated with a switch chamber (10) of a switch cylinder (2). The switch chamber (10) of switch cylinder (2) has exhibits at least one opening valve (26) and at least one closing valve (28) through additional valves (62, 64, 66, 68); and the pressure supply line (58) and the pressure exhaust line (60) are separately closed, opened, blocked and/or swapped.

3 Claims, 1 Drawing Sheet

U.S. PATENT DOCUMENTS

| | | | |
|---|---|---|---|
| 7,334,492 B2 * | 2/2008 | Muller et al. ............... | 74/335 |
| 2006/0107778 A1 * | 5/2006 | Muller et al. ............... | 74/335 |

FOREIGN PATENT DOCUMENTS

| | | | |
|---|---|---|---|
| DE | 100 29 497 A1 * | 1/2002 |
| DE | 10243282 A1 * | 4/2004 |
| DE | 102006031382 A1 * | 1/2008 |
| EP | 0 978 440 A2 * | 2/2000 |
| EP | 1 338 802 A2 * | 8/2003 |
| GB | 2 163 224 A * | 2/1986 |
| JP | 60220246 A * | 11/1985 |

* cited by examiner

SHIFTING UNIT

This application is a national stage completion of PCT/EP2005/001008 filed Feb. 2, 2005 which claims priority from German Application Serial No. 10 2004 006 683.3 filed Feb. 11, 2004.

FIELD OF THE INVENTION

The patent concerns a shifting unit.

BACKGROUND OF THE INVENTION

Modern transmissions, particularly in commercial vehicles, are increasingly controlled electronically; whereby the shift power is generated pneumatically or hydraulically, which improves the shift speed as well as the shift comfort. Transmissions of larger commercial vehicles are often divided into a main transmission, a split auxiliary transmission and a range auxiliary transmission. For example, this exhibits a pneumatically supported switch that executes the pneumatic gearshifts in split auxiliary transmissions and in regional-group gears; while the gearshifts in the main transmission could be supported by the synchronization with the help of the gear brakes at high shifts and with the help of motor for shift-in the executing force by pneumatic.

Such a switch for a gear is described in the DE 100 29 497 A1. This electro-pneumatic switch for a vehicle gear that exhibits a pneumatically shifted, split auxiliary transmission over valves and pneumatically shifted regional-group gear over a valve, requires an opening and a closing valve for each shift chamber of a switch cylinder that are linked to an air supply and an exhaust control with the cylinder chamber. If one of these valves fails then the functionality of these valves could not be changed for each cylinder chamber, whereby the availability of entire system is restricted and is not available in certain cases. Additionally, the dynamics of switch cylinder is very much limited.

The underlying task of the present patent is to represent an unrestricted availability of the switch also in case of valve failure, while not requiring thereby a solution involving complicated, failure contingent additional space. Further, the switch should improve the dynamic performance of the overall transmission system.

SUMMARY OF THE INVENTION

Complete availability of the overall transmission system during a single error in the switch thus allows that through the additional valve the pressure supply and pressure exhaust supply separated from each other could be closed and opened. Each cylinder bracket is populated with at least one valve with both opening and closing functions. Thereby it is possible to swap the functionality of the valves, whereby the function of each switch valve can be reversed. For valve error, e.g., through a short-circuit or a failure in supply of current, the valve is in an end position that cannot be turned off and thus the second position cannot be received. Consequently, the ventilation and exhaust of respective cylinder brackets cease to function, leading to a failure in the valve's functionality. Through the possibility of reversal and/or blocking and opening of the ventilation and exhaust, the second valve of the cylinder chamber takes over the usual function of the first valve of the cylinder chamber. Additionally, dynamic features like response time, acceleration of cylinder piston, damping, etc., can be improved.

Through the assembly of one or more valves in the pressure supply and the pressure exhaust supply lines, each line can be ventilated or exhaust or a closed system (capsule) within the system. Further, all the lines can supply pressure or exhaust or block. Thereby each valve can fulfill more tasks (pressure supply or pressure exhaust or blocking).

Complete availability in case of a single valve error can be reached through the pressure supply and pressure exhaust supply being swapped through the assembly of one or more valves in the pressure supply and pressure exhaust supply lines. Thereby the function of each valve can be reversed. For example, a valve in the feeder line is permanently opened by a short-circuit and pressure should be developed in the cylinder space, the feeders are exchanged. Thereby the defective valve affects a pressure reduction in the cylinder chamber. A further improvement allows achieving the pressure line and pressure exhaust supply through the separate opening and closing as well as blocking (damping).

A change of dynamics can thereby be achieved in that all the inner system pressure supply and pressure exhaust supply lines are closed. Further, a feeder line can be a pressure supply line and the other is closed. Further, a feeder line can be a pressure exhaust and the other is closed.

The usual function of the cylinder chamber valve is available instead through the availability of reversal and/or blocking and opening of the pressure supply and the pressure exhaust.

BRIEF DESCRIPTION OF THE DRAWING

The invention will now be described, by way of example, with reference to the accompanying drawings in which.

DETAILED DESCRIPTION OF THE INVENTION

Figure 1:
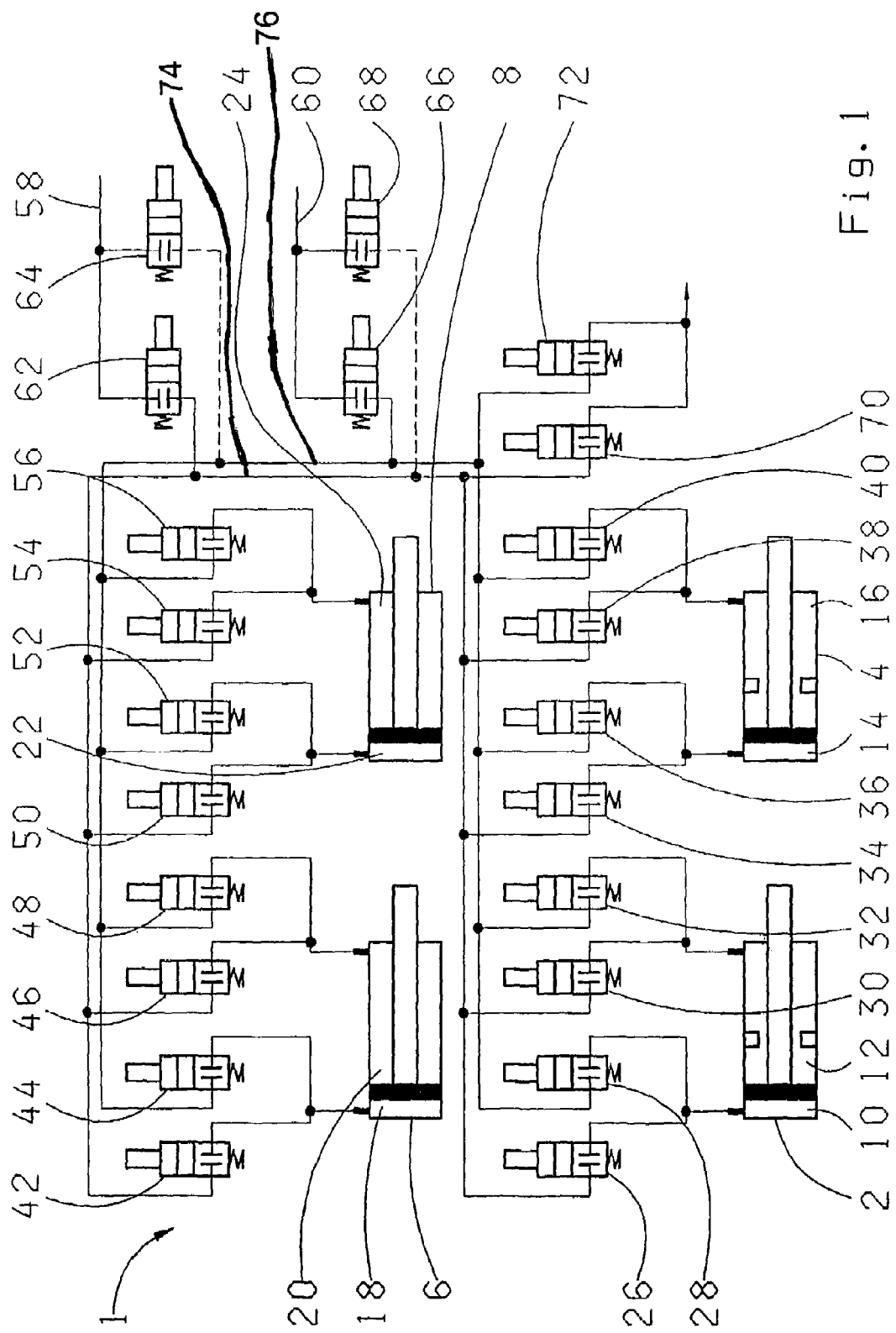
FIG. 1 shows the parts of the invention's switch 1, essentially an automatic switch with a basic gear, a split auxiliary transmission, a range auxiliary transmission and a gear brake.

A switch 1 displays switch cylinders 2, 4, 6 and 8 that can be placed in a common housing (not shown here). The switch cylinder 2 exhibits switch chambers 10 and 12, the switch cylinder 4 switch chambers 14 and 16, the switch cylinder 6 switch chambers 18 and 20 as well as the switch brackets 22 and 24. The switch bracket 10 of switch cylinder 2 is linked with an opening valve 26 and a closing valve 28. The switch chamber 12 of switch cylinder 2 is linked with an opening valve 30 and a closing valve 32. The switch chamber 14 of switch cylinder 4 is linked with an opening valve 34 and a closing valve 36. The switch chamber 16 of switch cylinder 4 is linked with an opening valve 38 and a closing 40. The switch chamber 18 of switch cylinder 6 is linked with an opening valve 42 and a closing valve 44. The switch chamber 20 of switch cylinder 6 is linked with an opening valve 46 and a closing valve 48. The switch chamber 22 of switch cylinder 8 is linked with an opening valve 50 and a closing valve 52. The switch chamber 24 of switch cylinder 8 is linked with an opening valve 54 and a closing valve 56. The opening valve 26, 30, 34, 38, 42, 46, 50 and 54 are linked to an additional valve 62 with a ventilation supply line 58 and on an additional valve 68 with an exhaust line 60. Closing valves 28, 32, 36, 40, 44, 52 and 56 are over additional valves 64 and 66 with an exhaust line 60 connected. The additional supply line 58 and the exhaust supply 60 can be closed/opened and/or functions can be changed separately from each other by the additional valve 62, 64, 66 and 68. Thereby it is possible that the opening valve 26, 30, 34, 38, 42, 46, 50 and 54 can over take and reverse the function of closing valve 28, 32, 36, 40, 44, 48, 52 and 56. The switch cylinder 2 described in the execution example is responsible for the switch of course R and 1 in round gear, the switch cylinder 4 for the switch of course 2 and 3 in the round gear, the switch cylinder 6 for the switch of split auxiliary transmission and the switch cylinder 8 for switching the range auxiliary transmission. A switch valve 70 is linked with the supply line 58 and a switch valve 72 with the exhaust line 60. The gear brakes that are not represented on the switch valve 70 and 72 is linked with the supply line 58 and the exhaust line 60.

| Reference numerals | |
|---|---|
| 1 switch | 36 closing valve |
| 2 switch cylinder | 38 opening valve |
| 4 switch cylinder | 40 closing valve |
| 6 switch cylinder | 42 opening valve |
| 8 switch cylinder | 44 closing valve |
| 10 switch chamber | 46 opening valve |
| 12 switch chamber | 48 closing valve |
| 14 switch chamber | 50 opening valve |
| 16 switch chamber | 52 closing valve |
| 18 switch chamber | 54 opening valve |
| 20 switch chamber | 56 closing valve |
| 22 switch chamber | 58 ventilation supply line |
| 24 switch chamber | 60 exhaust line |
| 26 opening valve | 62 additional valve |
| 28 closing valve | 64 additional valve |
| 30 opening valve | 68 additional valve |
| 32 closing valve | 70 switch valve |
| 34 opening valve | 72 switch valve |

The invention claimed is:

1. A switch (1) for a vehicle transmission, comprising:
   a plurality of switch cylinders (2, 4, 6, 8), each switch cylinder (2, 4, 6, 8) having a first switch chamber (10, 14, 18, 22) and a second switch chamber (12, 16, 20, 24);
   a first switch cylinder supply line (74) and a second switch supply line (76);
   a plurality of opening valves (26, 30, 34, 38, 42, 46, 50, 54) and a plurality of closing valves (28, 32, 36, 40, 44, 48, 52, 56),
   wherein the first switch chamber (10, 14, 18, 22) and the second switch chamber (12, 16, 20, 24) of each switch cylinder (2, 4, 6, 8) are each connected to the first switch cylinder supply line (74) through a corresponding one of opening valves (26, 30, 34, 38, 42, 46, 50, 54) and to the second switch supply line (76) through a corresponding one of the closing valves (28, 32, 36, 40, 44, 48, 52, 56);
   a ventilation supply line (58) and an exhaust line (60);
   a first additional valve (62) connected between the ventilation supply line (58) and the first switch cylinder supply line (74);
   a second additional valve (64) connected between the ventilation supply line (58) and the second switch supply line (76);
   a third additional valve (66) connected between the exhaust line (60) and the first switch cylinder supply line (74); and
   a fourth additional valve (68) connected between the exhaust line (60) and the second switch supply line (76); whereby the connections between one of the first switch cylinder supply line (74) and the second switch supply line (76) and the ventilation supply line (58) and the exhaust line (60) through the first, second, third and fourth additional valves (62, 64, 66, 68) may be selectively swapped, and whereby
   a function of an opening valve (26, 30, 34, 38, 42, 46, 50, 54) and a function of a corresponding closing valve (28, 32, 36, 40, 44, 48, 52, 56) may be selectively exchanged.

2. A switch (1) for a vehicle transmission, comprising:
   a switch cylinder (2);
   a first switch cylinder supply line (74) and a second switch supply line (76);
   an opening valve (26) connected between the first switch cylinder supply line (74) and a switch chamber (10, 12) of the switch cylinder (2);
   a closing valve (28) connected between the second cylinder supply line (76) and the switch chamber (10, 12) of the switch cylinder (2);
   a ventilation supply line (58) and an exhaust line (60);
   a first additional valve (62) connected between the ventilation supply line (58) and the first switch cylinder supply line (74);
   a second additional valve (64) connected between the ventilation supply line (58) and the second switch supply line (76);
   a third additional valve (66) connected between the exhaust line (60) and the first switch cylinder supply line (74); and
   a fourth additional valve (68) connected between the exhaust line (60) and the second switch supply line (76); whereby the connections between one of the first switch cylinder supply line (74) and the second switch supply line (76) and the ventilation supply line (58) and the exhaust line (60) through the first, second, third and fourth additional valves (62, 64, 66, 68) may be selectively swapped, and
   a function of the opening valve (26) and a function of the closing valve (28, 32, 36, 40, 44, 48, 52, 56) may be selectively exchanged.

3. The switch (1) according to claim 2, wherein the opening valve (26) and the closing valve (25) are each one of a directional valve, a proportional valve and a combination of a directional valve and a proportional valve.

* * * * *